(12) United States Patent
Jayaraman et al.

(10) Patent No.: US 8,351,579 B2
(45) Date of Patent: Jan. 8, 2013

(54) SYSTEM AND METHOD FOR SECURELY AUTHENTICATING AND LAWFULLY INTERCEPTING DATA IN TELECOMMUNICATION NETWORKS USING BIOMETRICS

(75) Inventors: Venkata Subramanian Jayaraman, Chennai (IN); Veera Raghavan Seshadri, Chennai (IN)

(73) Assignee: Wipro Limited, Bangalore, Karnataka (IN)

( * ) Notice: Subject to any disclaimer, the term of this patent is extended or adjusted under 35 U.S.C. 154(b) by 343 days.

(21) Appl. No.: 12/887,522

(22) Filed: Sep. 22, 2010

(65) Prior Publication Data

US 2012/0069971 A1    Mar. 22, 2012

(51) Int. Cl.
*H04M 1/24* (2006.01)
*H04M 3/08* (2006.01)
*H04M 3/22* (2006.01)

(52) U.S. Cl. ............... 379/35; 379/32.01; 379/32.05

(58) Field of Classification Search .............. 379/7, 32.01–32.05, 35
See application file for complete search history.

(56) References Cited

U.S. PATENT DOCUMENTS

| | | | |
|---|---|---|---|
| 7,092,493 B2* | 8/2006 | Hou et al. | 379/35 |
| 7,730,521 B1* | 6/2010 | Thesayi et al. | 726/4 |
| 2002/0051518 A1* | 5/2002 | Bondy et al. | 379/35 |
| 2005/0175156 A1* | 8/2005 | Afshar et al. | 379/35 |
| 2006/0174323 A1 | 8/2006 | Brown et al. | |
| 2007/0061590 A1 | 3/2007 | Boye et al. | |
| 2007/0245152 A1 | 10/2007 | Pizano et al. | |
| 2008/0015859 A1 | 1/2008 | Novack et al. | |
| 2008/0152100 A1 | 6/2008 | Kondziela | |
| 2009/0141883 A1 | 6/2009 | Bastien | |
| 2009/0183247 A1 | 7/2009 | Kasper et al. | |

* cited by examiner

*Primary Examiner* — Quoc D Tran
(74) *Attorney, Agent, or Firm* — Prakash Nama; Global IP Services, PLLC

(57) ABSTRACT

A system and method for securely authenticating and lawfully intercepting data in a telecommunication network using biometrics is disclosed. In one embodiment, in a method for securely authenticating and lawfully intercepting data using biometrics, one or more persons associated with a law enforcement agency (LEA) are authenticated by a telecommunication network provider. The authentication is performed upon receiving a request for lawful interception of data from the one or more persons associated with the LEA. Then, the lawful interception request associated with a registered telecommunication network user is activated to obtain the data. The data is intercepted user upon a successful match with a requested registered telecommunication network user by the LEA. Further, intercepted data along with the biometric information associated with the registered telecommunication network user is sent to the authenticated one or more persons associated with the LEA via the telecommunication network.

18 Claims, 8 Drawing Sheets

SYSTEM AND METHOD FOR SECURELY AUTHENTICATING AND LAWFULLY INTERCEPTING DATA IN TELECOMMUNICATION NETWORKS USING BIOMETRICS

BACKGROUND

VoIP (Voice over Internet Protocol) is a telecommunications method for transmitting voice communications over the Internet. Common VoIP implementations are in telephony where telephone conversations are partly carried over the Internet from a caller telephone to a called telephone. A VoIP call is a voice call connected using VoIP technology. VoIP data represents voice signals in the voice call that is connected through VoIP systems. Call content is the substance of the voice call. The call content may be collected, stored, and transmitted in the form of analog or digital signals. The call content of a VoIP call is VoIP data that represents the substance of the VoIP call.

A VoIP provider is a provider of telecommunications services using VoIP technology. Typically, as per requirements of local regulations, the VoIP providers are requested by an LEA (Law Enforcement Agency) to intercept calls connecting through their VoIP systems and deliver call contents to the LEA if the LEA is lawfully authorized to do so. In order to comply with the local regulations, the VoIP providers are required to maintain a communications link to each LEA that may request a lawful intercept.

During the process of lawful interception, the LEA may request the VoIP provider to provide details such as data or voice of a target (who is the intercepted person). However, there is no existing reliable online authentication process of the LEA made towards the VoIP providers during this process. As a result of the missing reliable online authentication process, there is no guarantee from the VoIP provider point of view whether the data is being provided to a correct lawfully intended person associated with the LEA.

One of the existing methods for providing data during lawful interception requires using password verification in which the LEA has to establish a connection with the VoIP network and provide specific user identifier (ID) and password. Upon receiving such authentication credentials from the LEA, the VoIP provider validates and authenticates the LEA network requesting the lawful interception. Such authentication of the LEA using the password over the network can be vulnerable to hacking, prone to illegal activities and may not provide needed additional security and authentication. Other authentication techniques may be via secure connection and secure codes.

Further, the above technique authenticates the LEA network and not the person trying gain access to the intercepted data. Furthermore, the above technique lacks to establish the identity of the person trying to gain access via the LEA network instantly over the VoIP network to the network operator before seeking access to intercept lawfully. Also, typically, lawful interception process intercepts both data and voice of an end-user. The information gathered during this interception process by the LEA may be provided to a crime department or an investigation bureau. However, the information obtained using this process can only be taken as additional evidence and not as conclusive evidence during criminal proceedings. The reason being that the data obtained using the above authentication process may not be used to establish a strong substantial proof with the user's identity as the involved person can argue and try to take advantage of this missing link and disassociate his/her connection with the intercepted data. In such a scenario, there is no evidence to prove that the intercepted data and the voice belong to the same person, as there is no unique personal identity associated or linked with the intercepted content. It may easier for the intercepted person to get away in the court of law by saying that the same has been morphed and it does not belong to self, when presented during criminal proceedings. In such instances, the produced intercepted data may not be taken as conclusive evidence in the court to give any verdict against the criminals.

BRIEF DESCRIPTION OF THE DRAWINGS

Various embodiments are described herein with reference to the drawings, wherein.

The drawings described herein are for illustration purposes only and are not intended to limit the scope of the present disclosure in any way.

DETAILED DESCRIPTION

A system and method for securely authenticating and lawfully intercepting data in telecommunication networks using biometrics is disclosed. In the following detailed description of the embodiments of the present subject matter, reference is made to the accompanying drawings that form a part hereof, and in which are shown by way of illustration specific embodiments in which the present subject matter may be practiced. These embodiments are described in sufficient detail to enable those skilled in the art to practice the present subject matter, and it is to be understood that other embodiments may be utilized and that changes may be made without departing from the scope of the present subject matter. The following detailed description is, therefore, not to be taken in a limiting sense, and the scope of the present subject matter is defined by the appended claims.

The terms 'biometrics' and 'biometric information' are used interchangeably throughout the document.

Figure 1:
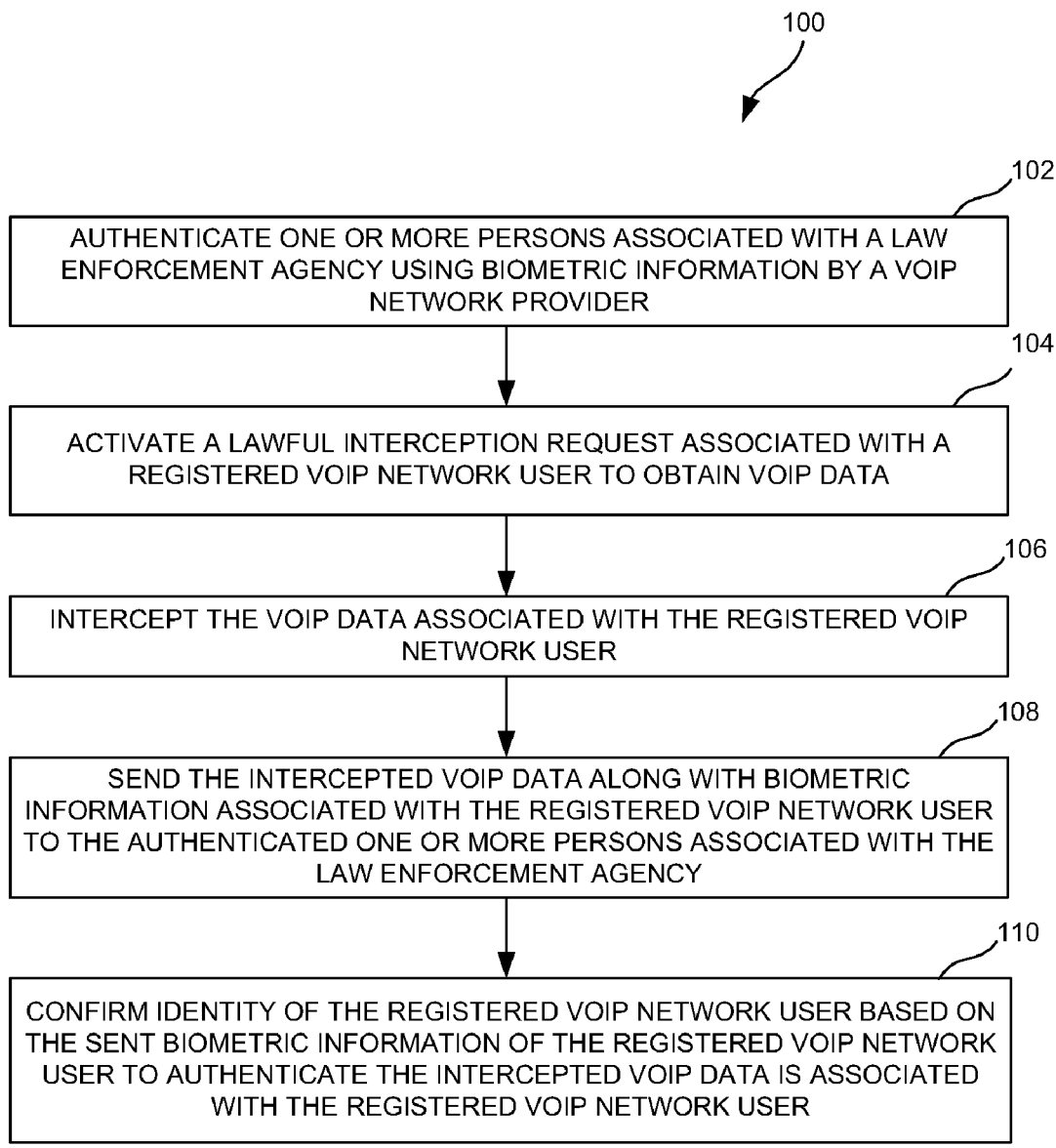
FIG. 1 illustrates a flow diagram of a method for securely authenticating and lawfully intercepting data in a telecommunication network using biometrics, according to one embodiment.

FIG. 1 illustrates a flow diagram 100 of a method for securely authenticating and lawfully intercepting data in a telecommunication network using biometrics, according to one embodiment. In one exemplary implementation, the telecommunication network is a voice over Internet protocol (VoIP) network and the intercepted data is VoIP data. At step 102, one or more persons associated with a law enforcement agency (LEA) (e.g., the LEA of FIGS. 3 through 6) are authenticated using biometric information by a VoIP network provider. The authentication is based upon receiving a request for lawful interception (LI) of the VoIP data (e.g., associated with a registered VoIP network user) from the one or more persons associated with the LEA. At step 104, the LI request associated with the registered VoIP network user is activated to obtain the VoIP data upon a successful authentication of the one or more persons associated with the LEA. In one embodiment, the VoIP network provider has biometric information (e.g., fingerprint, iris recognition, face recognition, DNA, palm print, etc.) associated with the registered VoIP network user.

At step 106, the VoIP data associated with the registered VoIP network user is intercepted upon a successful match with a requested registered VoIP network user by the LEA. At step 108, the intercepted VoIP data along with the biometric information associated with the registered VoIP network user is sent to the authenticated one or more persons associated with the LEA via the VoIP network. According to an embodiment of the present subject matter, the biometric information of the one or more persons associated with the LEA and the biometric information of the registered VoIP network user are stored in a lawful interception user authentication database (e.g., the lawful interception user authentication database 308 of FIGS. 3 through 7) associated with the VoIP network.

For example, the biometric information associated with the registered VoIP network user is obtained using a device configured to receive the biometric information during an initial registration of the VoIP network user with the VoIP network. Further, the obtained biometric information associated with the registered VoIP network user is stored in the lawful interception user authentication database. At step 110, identity of the registered VoIP network user is confirmed by the LEA based on the sent biometric information to authenticate the intercepted VoIP data is associated with the registered VoIP network user.

In one embodiment, when the registered VoIP network user wishes to make a VoIP call, a request is made to gain access to the VoIP network. Upon receiving the request from the registered VoIP network user, the biometric information associated with the registered VoIP network user is obtained by the VoIP network. The obtained biometric information is matched with the biometric information stored in the lawful interception user authentication database in the VoIP network.

Then, access is provided to the registered VoIP network user to make the VoIP call using the VoIP network upon a successful association. Moreover, in one example embodiment, a non-transitory computer-readable storage medium for securely authenticating and lawfully intercepting VoIP data using biometrics has instructions that, when executed by a computing device, cause the computing device to perform the method as described above.

Figure 2:
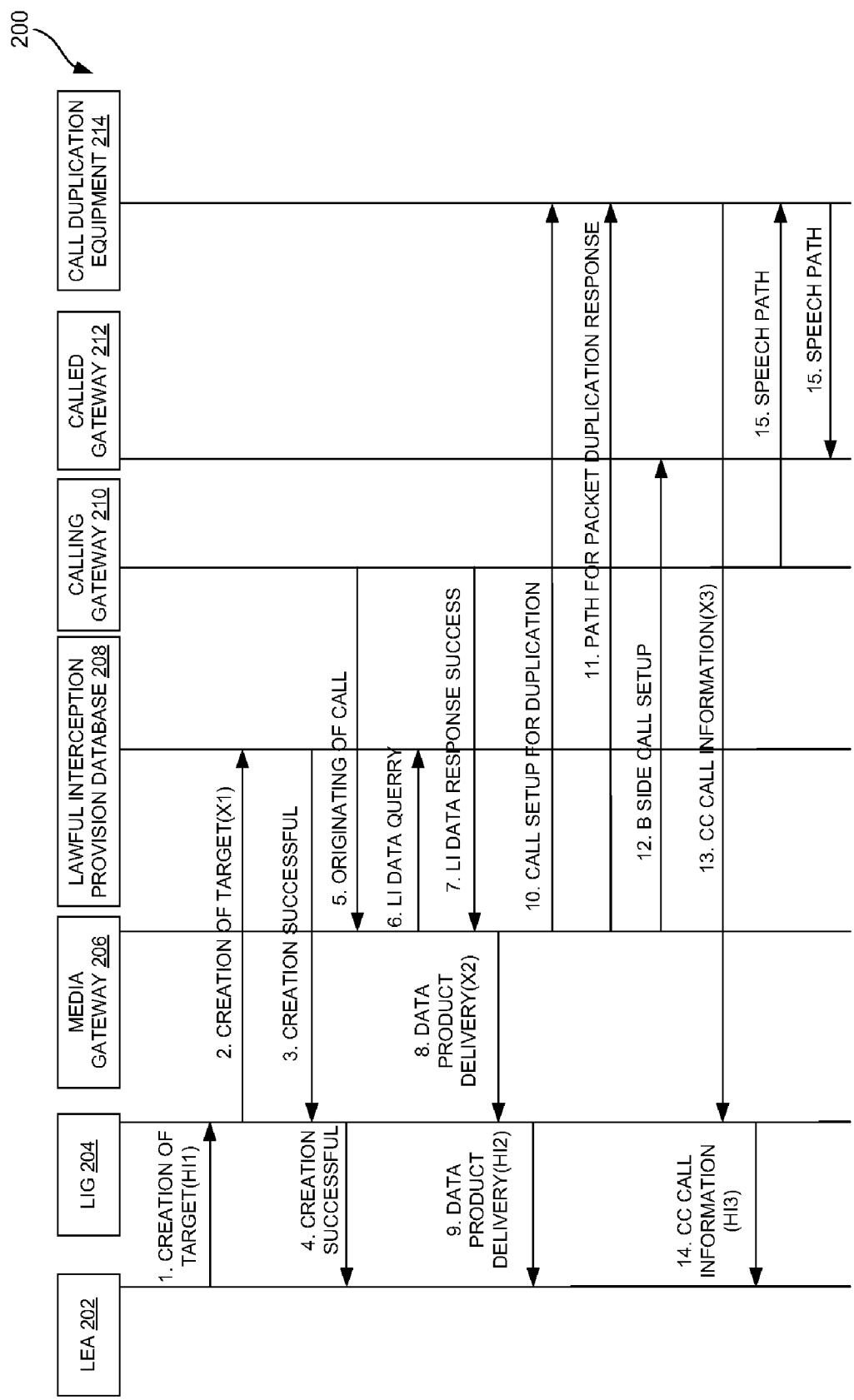
FIG. 2 is a sequence diagram illustrating signals exchanged sequentially during a lawful interception (LI) activation request by an authenticated law enforcement agency (LEA) in a VoIP network, in the context of the present subject matter.

FIG. 2 is a sequence diagram 200 illustrating signals exchanged sequentially during an LI activation request by an authenticated LEA 202 in the VoIP network, in the context of the present subject matter. The authenticated LEA 202 requests for an LI in the VoIP network using a handover interface 1 (HI1). The LI may refer to lawfully intercepting a VoIP call in the VoIP network to obtain data such as speech, short message service (SMS), facsimile, etc. associated with a registered VoIP network user.

The request moves through a lawful interception gateway (LIG) 204 and via X1 interface moves to a lawful interception provision database 208. In this way, a target (e.g., a registered VoIP network user) is created and assigned for the LI. The report of successful creation of the target is sent to the LIG 204 and the LEA 202. At some instance, a VoIP call is made by the target. Then, a query is made to the lawful interception provision database 208 via a media gateway 206 to verify whether the call is originated from the target.

Once the target is verified, the LI is routed towards a call duplication equipment 214. The call duplication equipment 214 duplicates information exchanged by the target. The information is then sent to the LEA 202. During the VoIP call, a calling gateway 210 checks for a match of the target in the interception provision database 208. The information flows to the LIG 204 via X2 interface and to the LEA 202 via an HI2 interface. The closure of transaction may be triggered by end via the X2 interface.

After a successful response from terminating side, a call setup is triggered and information flows towards the LIG 204 and LEA 202 through an X3 interface and an HI3 interface, respectively. The speech path is connected via the calling gateway 210, call duplication equipment 214, and then the called gateway 212. The features of LI may include authentication, confidentiality, integrity, and non-repudiation.

Figure 3:
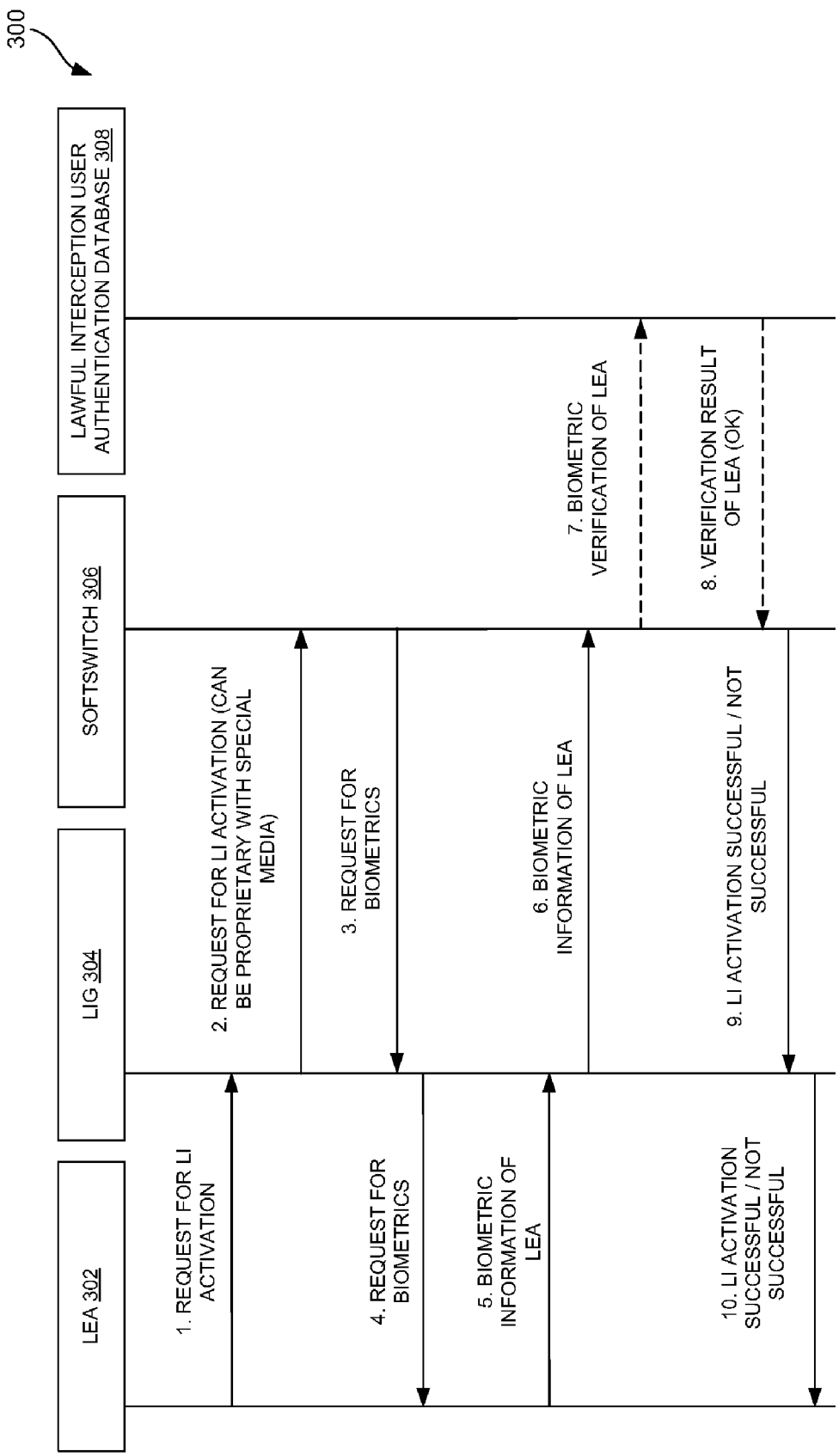
FIG. 3 is a sequence diagram illustrating signals exchanged sequentially during a successful biometric information authentication of an LEA in the VoIP network, according to one embodiment.

FIG. 3 is a sequence diagram 300 illustrating signals exchanged sequentially during a successful biometric information authentication of an LEA 302 in the VoIP network, according to one embodiment. As shown, the LEA 302 sends a request for LI activation to an LIG 304. The request goes to a softswitch 306 from where a request for biometric information is generated. The request for biometric information goes to the LIG 304 and the LEA 302. The LEA 302 sends the biometric information (e.g., fingerprint, iris recognition, face recognition, DNA, palm print, etc.) to the LIG 304 and to the softswitch 306.

The authentication of the LEA 302 is performed using a lawful interception user authentication database 308 which stores biometrics associated with various LEAs. Based on the authentication of the LEA 302, the LI is activated by the softswitch 306. The success report is sent to the LIG 304 and the LEA 302. The authentication of the LEA 302 upon receiving the request for LI activation ensures that the LEA 302 is not misused and intercepted information is not shared with any unauthenticated persons or agencies.

Figure 4:
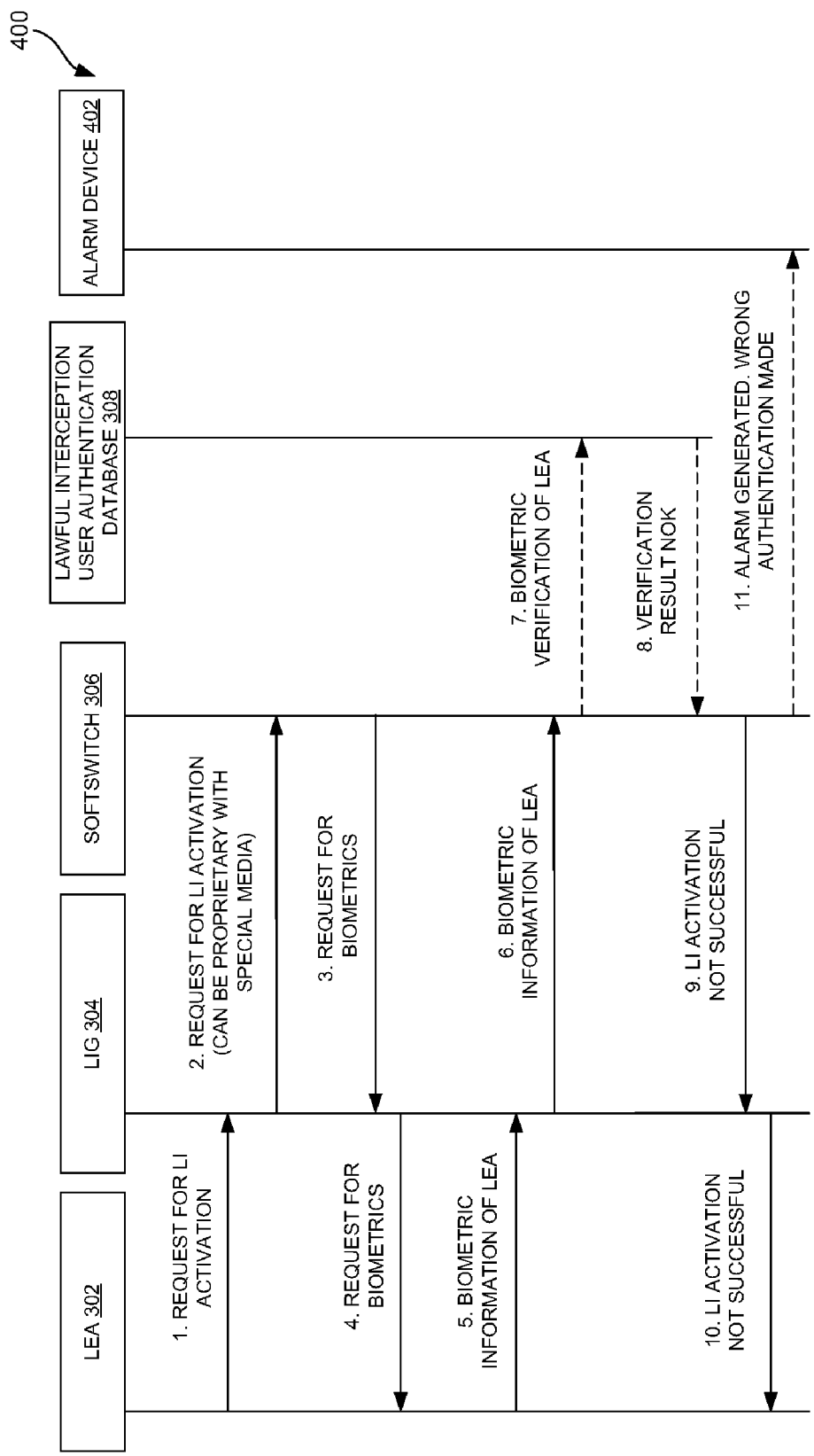
FIG. 4 is a sequence diagram illustrating signals exchanged sequentially during an unsuccessful biometric information authentication of the LEA in the VoIP network, according to another embodiment.

FIG. 4 is a sequence diagram 400 illustrating signals exchanged sequentially during an unsuccessful biometric information authentication of the LEA 302 in the VoIP network, according to another embodiment. When the authentication of the LEA 302 fails, result goes to the softswitch 306 about the failure. Accordingly, the LI is not activated and report of the unsuccessful LI activation is sent to the LIG 304 and the LEA 302. An alarm 402 is also generated by the softswitch 306 about the wrong authentication of the LEA 302.

Figure 5:
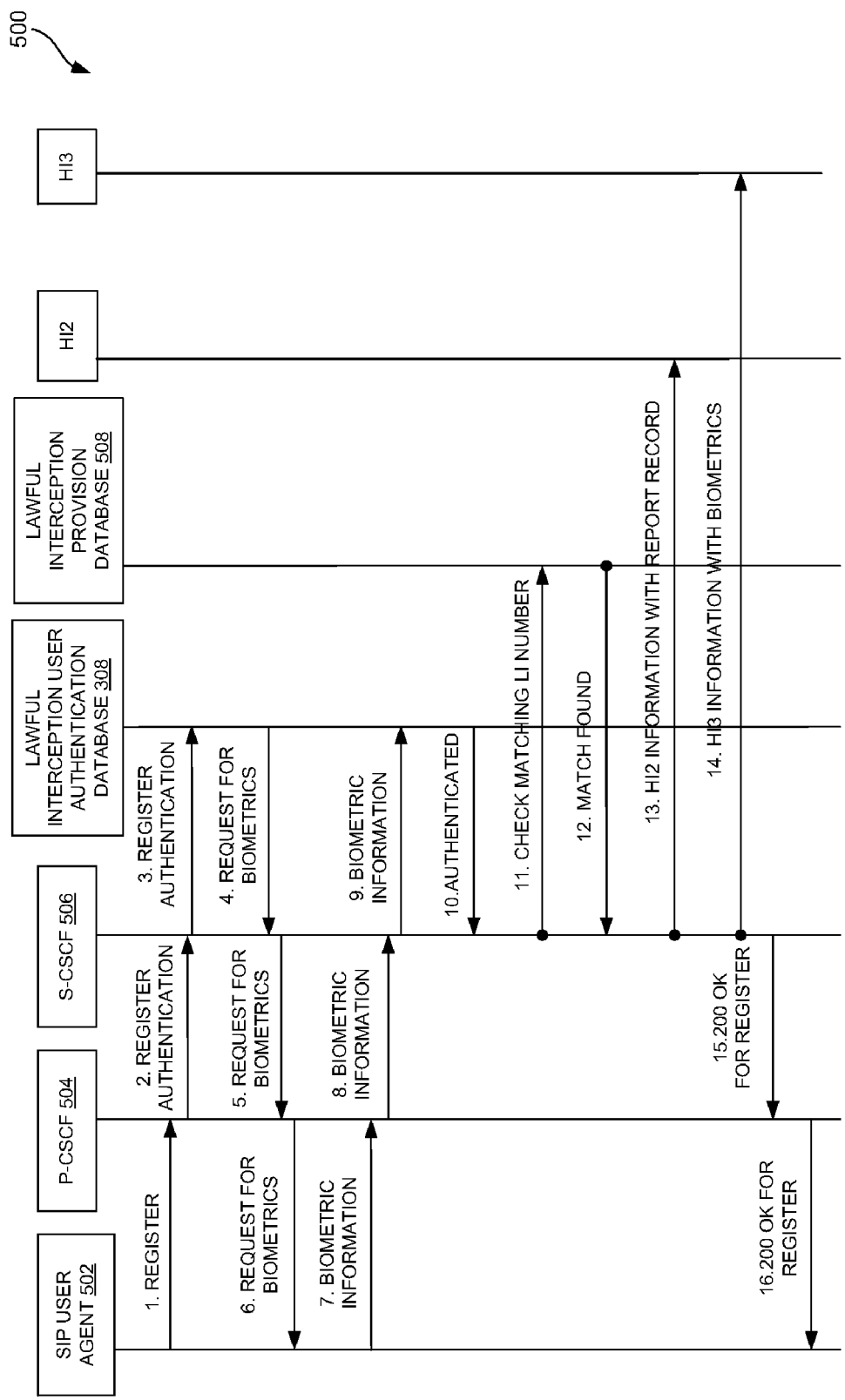
FIG. 5 is a sequence diagram illustrating signals exchanged sequentially during a successful biometric information authentication of a target in the VoIP network, according to one embodiment.

FIG. 5 is a sequence diagram 500 illustrating signals exchanged sequentially during a successful biometric information authentication of the target in the VoIP network, according to one embodiment. As shown, a session initiation protocol (SIP) user agent 502 registers in the VoIP network. The register authentication is received by a proxy call session control function (P-CSCF) 504 and a serving call session control function (S-CSCF) 506. The authentication occurs based on the biometric information stored in the lawful interception user authentication database 308.

A request for biometric information is sent to the P-CSCF 504 and the S-CSCF 506. The SIP user agent 502 sends the biometric information and is authenticated using the lawful interception user authentication database 308. Once authenticated, for every VoIP call by the SIP user agent 502, a matching LI number is checked in a lawful interception provision database 508. When a match is found, HI2 information with report record and HI3 information with biometrics is sent to HI2 interface and HI3 interface, respectively. HI2 information and HI3 information are explained in more detail in the below description. The HI2 information and the HI3 information are sent to the LEA 302 upon a request made by the LEA 302 in the VoIP network.

Figure 6:
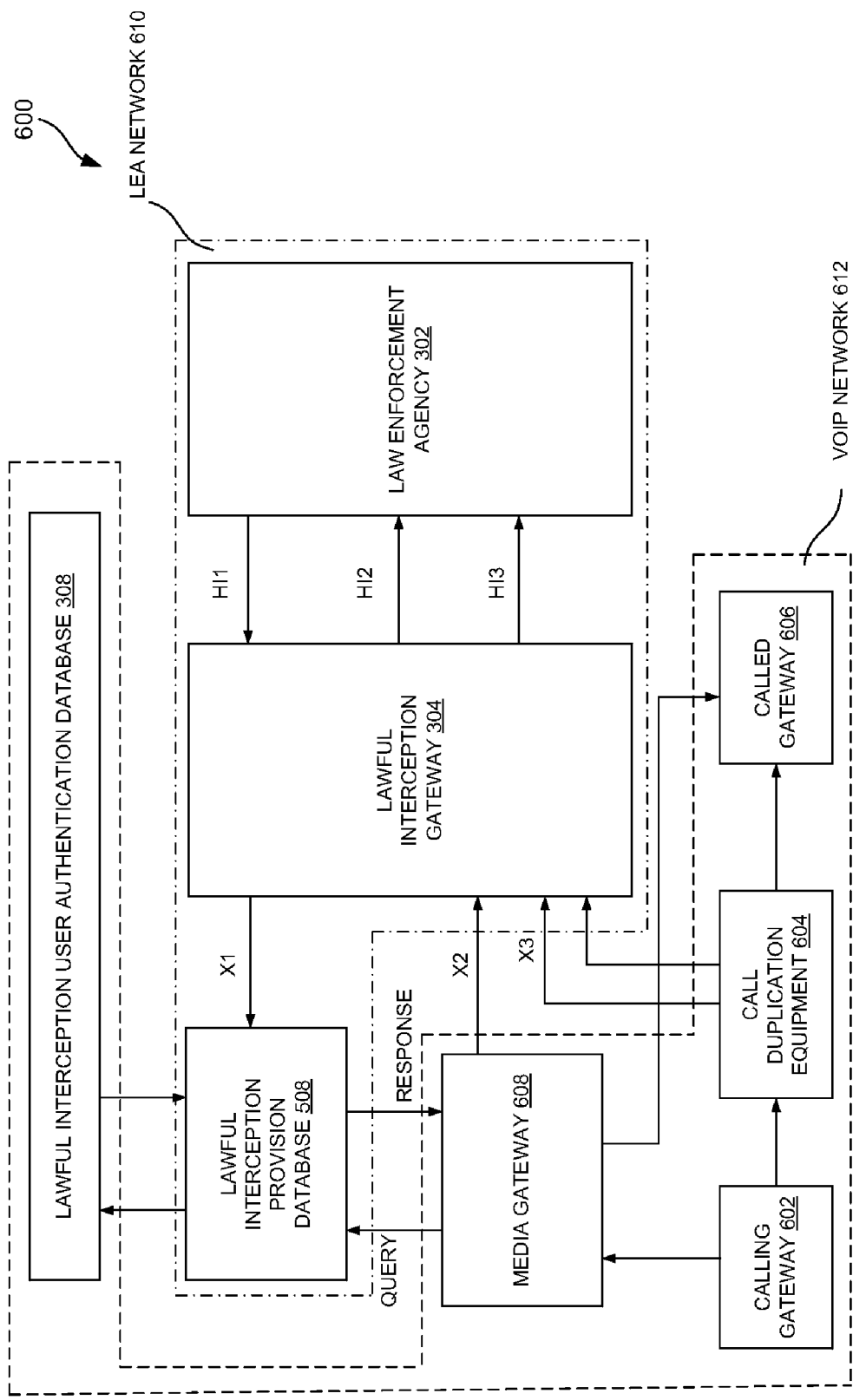
FIG. 6 is a block diagram illustrating biometric information authentication for LI in the VoIP network, according to one embodiment.

FIG. 6 is a block diagram 600 illustrating biometric information authentication for LI in a VoIP network 612, according to one embodiment. As shown, the block diagram 600 includes a LEA network 610 including the LEA 302, the LIG 304, and the lawful interception provision database 508. The VoIP network 612 includes the lawful interception user authentication database 308, a calling gateway 602, a call duplication equipment 604, a called gateway 606 and a media gateway 608. The lawful interception user authentication database 308 is also coupled to the LEA network 610 and includes biometric information associated with the LEA 302 and biometric information of registered users of the VoIP network 612. It can be seen from FIG. 6 that, an HI1 interface transports administrative information from the LEA 302. The HI1 interface transmits requests from the LEA 302 to establish or to remove LI in the VoIP network 612. It can be noted that the HI1 interface supports manual transmission during a failure of automatic transmission between the LEA 302 and the LIG 304.

Further, an HI2 interface transports all intercept related information (IRI) from the LIG 304. The HI2 interface transmits information or data associated with telecommunication services of the target apparent to the VoIP network 612. The information may include signaling information used to establish the telecommunication service and to control its progress (e.g. target identification, identifications of other parties of communication, basic services used, direction of call or event, answer indication and/or release causes, time stamps, etc.). The IRI include record type description, begin record at a first event of a call or service attempt, end record at the end of a call or service attempt, continue record at any time during a call or service attempt (e.g. in-call service activation/deactivation), and report record if no call association is available (e.g. activation/deactivation of features, use of a non-call associated service). In one embodiment of the present subject matter, the HI2 interface sends location of the biometric information to the LEA 302 from where the biometric information may be retrieved. The biometric information may be retrieved by the LEA 302 from the VoIP network 612 through the HI2 interface or an HI3 interface or in a query-response model.

The HI3 interface also transmits intercepted VoIP data to the LEA 302. The content of communication may be presented as a simple copy of information flow during an established, frequently bi-directional, communication of the interception subject. The information may include voice or data. In cases of a failure, the content of communication is lost since the VoIP network 612 does not provide any recording functions. In one exemplary implementation, the HI3 interface collects intercepted data from various switches, routers, probes, etc. in the VoIP network 612. Then, the intercepted data is formatted into standardized representations and delivered to the LEA 302. The HI3 interface ensures that the intercepted data is delivered to an authenticated LEA only. Thus, the HI3 interface protects all delivered information against unauthorized access and modification through rigorous network security.

In one embodiment, the VoIP network 612 authenticates one or more persons associated with the LEA network 610 using biometric information upon receiving a request for LI of VoIP data from the one or more persons associated with the LEA network 610. When the one or more persons associated with the LEA network 610 are authenticated, the VoIP network 612 activates the LI request associated with the registered VoIP network user to obtain the VoIP data. Further, the VoIP network 612 intercepts the VoIP data associated with the registered VoIP network user upon a successful match with a requested registered VoIP network user by the LEA network 610.

Then, the VoIP network 612 sends the intercepted VoIP data along with the biometric information associated with the registered VoIP network user to the authenticated one or more persons associated with the LEA network 610. Based on the sent information of the registered VoIP network user by the VoIP network 612, the LEA network 610 confirms identity of the registered VoIP network user to authenticate the intercepted VoIP data is associated with the registered VoIP network user.

In one exemplary implementation, the VoIP network 612 obtains the biometric information associated with the registered VoIP network user using a device configured to receive the biometric information during an initial registration of the VoIP network user. The obtained biometric information is then stored in the lawful interception user authentication database 308. The VoIP network 612 obtains the biometric information associated with the registered VoIP network user upon a request of the registered VoIP network user to gain access to the VoIP network 612 to make a VoIP call. Then, the VoIP network 612 associates the obtained biometric information from the VoIP network user with the biometric information stored in the lawful interception user authentication database 308. Based on a successful association, the VoIP network 612 provides access to the registered VoIP network user to make the VoIP call.

Figure 7:
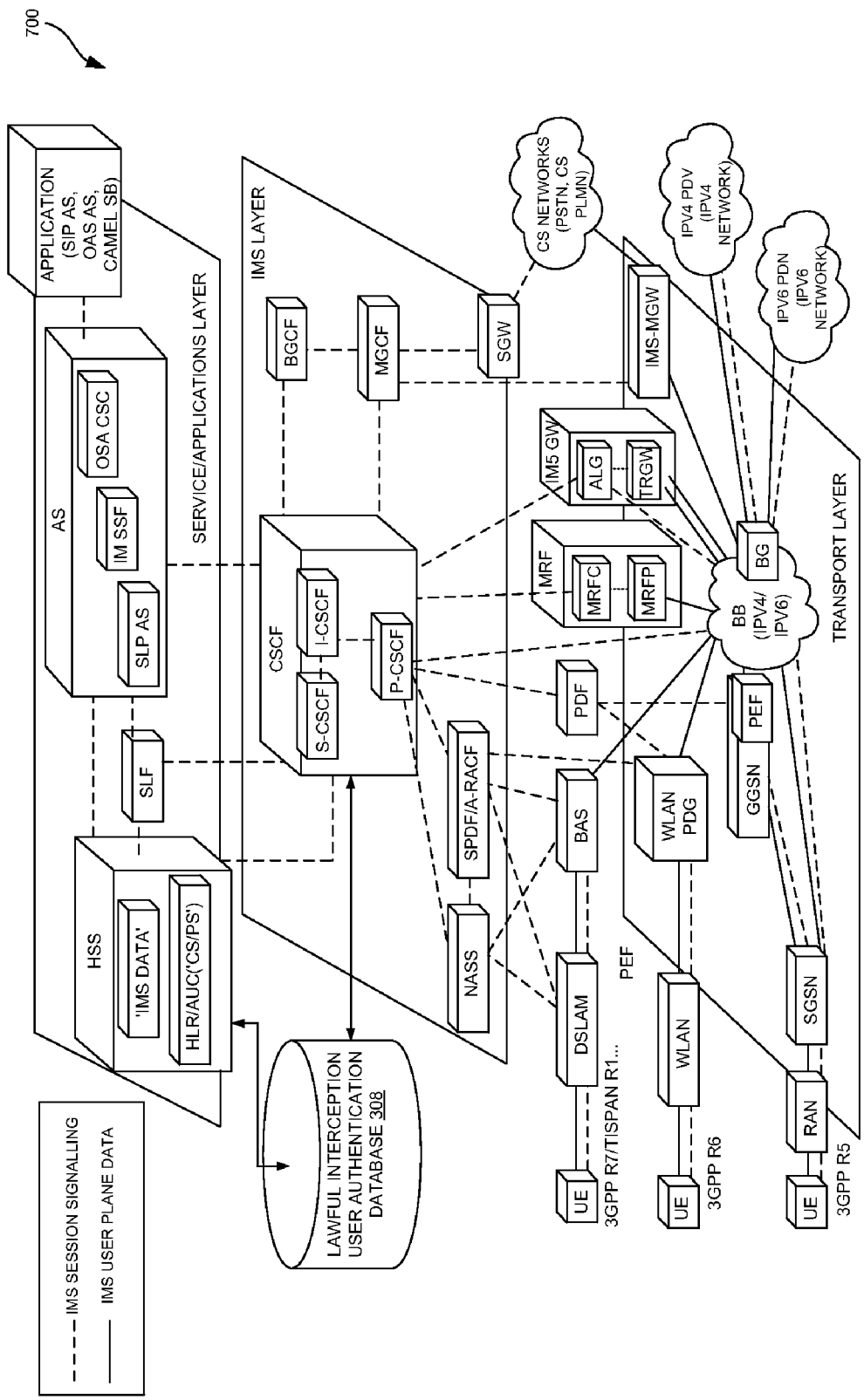
FIG. 7 illustrates an internet protocol multimedia system (IMS) architecture employing biometric information authentication for LI, accordingly to one embodiment.

FIG. 7 illustrates an internet protocol multimedia system (IMS) architecture 700 employing biometric information authentication for LI, accordingly to one embodiment. The IMS architecture 700 is an architectural framework for delivering internet protocol (IP) multimedia services. Since the IMS architecture is well known in the art, the explanation is thereby omitted. As illustrated in FIG. 7, for biometric information authentication for LI, the lawful interception user authentication database 308 is employed in the IMS architecture 700 between a CSCF layer and an HSS layer.

Figure 8:
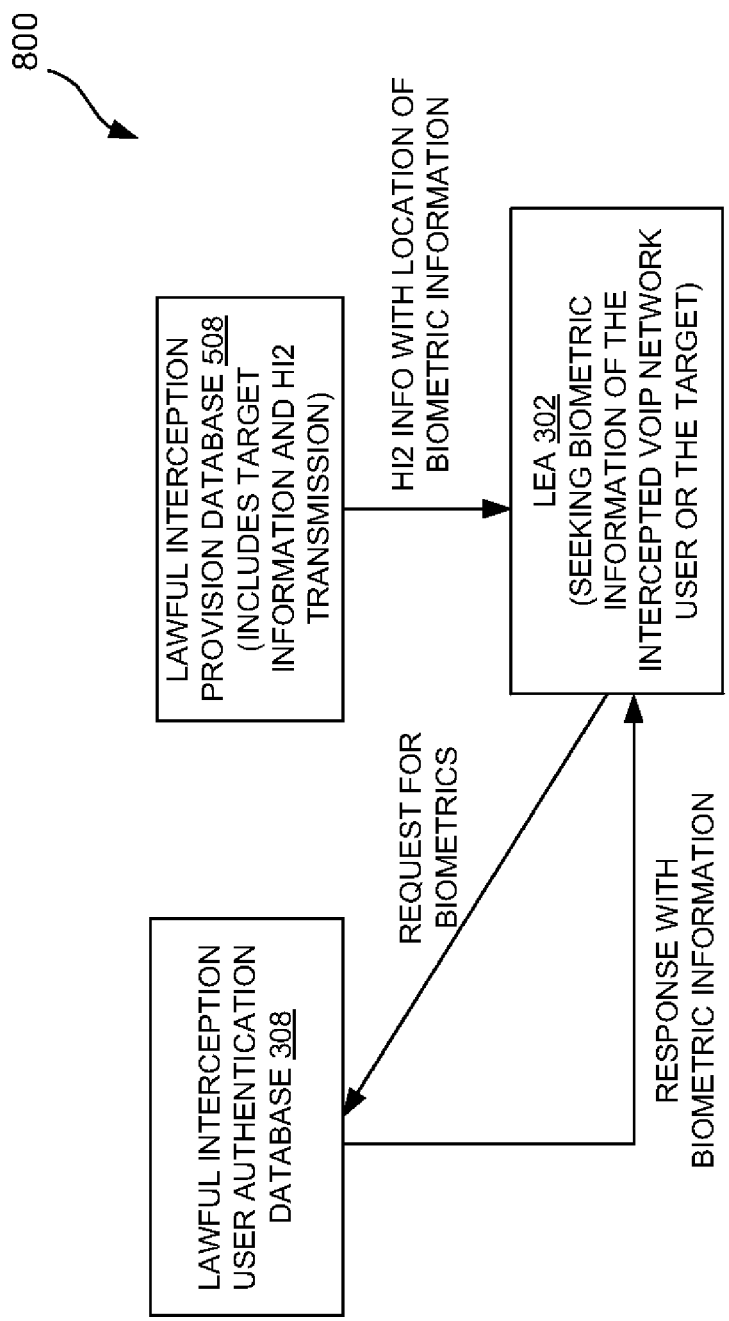
FIG. 8 is a block diagram illustrating transmission of biometric information of the target to the LEA, according to one embodiment.

FIG. 8 is a block diagram 800 illustrating transmission of the biometric information of the target to the LEA 302, according to one embodiment. As shown, the LEA 302 receives the IRI of the target from the lawful interception provision database 508 through the HI2 interface in the VoIP network. According to an embodiment of the present subject matter, the HI2 interface also sends location of the biometric information of the target to the LEA 302. The biometric information is stored in the lawful interception user authentication database 308. The LEA 302 may retrieve the biometric information of the target through the HI2 interface or the HI3 interface or in a query-response model.

In various embodiments, the above-described methods and systems of FIGS. 1 through 8 are $3^{rd}$ generation partnership project (3GPP) compliant and are easy to implement. The above-described methods and systems are reliable and cost effective. Since only existing biometric recorders or detecting devices need to be employed in the telecommunication network, the above-described methods and systems are easily deployed. Further, the above-described methods and systems may be extended to any area requiring authentication and which needs to be maintained secure.

Although, the present embodiments have been described with reference to specific example embodiments, it will be evident that various modifications and changes may be made to these embodiments without departing from the broader spirit and scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method for securely authenticating and lawfully intercepting data in a telecommunication network using biometrics, comprising:
    authenticating one or more persons associated with a law enforcement agency (LEA) using biometric information by a telecommunication network provider upon receiving a request for lawful interception of data from the one or more persons associated with the LEA;
    activating the lawful interception request associated with a registered telecommunication network user to obtain the data upon a successful authentication of the one or more persons associated with the LEA, wherein the telecommunication network provider having biometric information associated with the registered telecommunication network user;
    intercepting the data associated with the registered telecommunication network user upon a successful match with a requested registered telecommunication network user by the LEA; and
    sending the intercepted data along with the biometric information associated with the registered telecommunication network user to the authenticated one or more persons associated with the LEA via the telecommunication network.

2. The method of claim 1, wherein the telecommunication network comprises a voice over Internet protocol (VoIP) network.

3. The method of claim 1, wherein sending the biometric information associated with the registered telecommunication network user to the authenticated one or more persons associated with the LEA comprises sending location of the biometric information via a handover interface to the authenticated one or more persons associated with the LEA in the telecommunication network.

4. The method of claim 3, wherein the biometric information of the one or more persons associated with the LEA and the biometric information of the registered telecommunication network user are stored in a lawful interception user authentication database associated with the telecommunication network.

5. The method of claim 4, further comprising:
    confirming identity of the registered telecommunication network user by the LEA based on the sent biometric information of the registered telecommunication network user by the telecommunication network to authenticate the intercepted data is associated with the registered telecommunication network user.

6. The method of claim 5, further comprising:
    obtaining the biometric information associated with the registered telecommunication network user using a device configured to receive the biometric information during an initial registration of the telecommunication network user with the telecommunication network; and
    storing the obtained biometric information associated with the registered telecommunication network user in the lawful interception user authentication database.

7. The method of claim 6, further comprising:
    providing biometric information by the registered telecommunication network user to gain access to the telecommunication network to make a call;
    obtaining the biometric information associated with the registered telecommunication network user by the telecommunication network upon a request of the registered telecommunication network user to gain access to the telecommunication network to make the call;
    associating the obtained biometric information from the registered telecommunication network user with the biometric information stored in the lawful interception user authentication database in the telecommunication network; and
    providing access to the registered telecommunication network user to make the call using the telecommunication network upon a successful association.

8. A non-transitory computer-readable storage medium for securely authenticating and lawfully intercepting data in a telecommunication network using biometrics has instructions that, when executed by a computing device cause the computing device to perform a method comprising:
    authenticating one or more persons associated with a LEA using biometric information by a telecommunication network provider upon receiving a request for lawful interception of data from the one or more persons associated with the LEA;
    activating the lawful interception request associated with a registered telecommunication network user to obtain the data upon a successful authentication of the one or more persons associated with the LEA, wherein the telecommunication network provider having biometric information associated with the registered telecommunication network user;
    intercepting the data associated with the registered telecommunication network user upon a successful match with a requested registered telecommunication network user by the LEA; and
    sending the intercepted data along with the biometric information associated with the registered telecommunication network user to the authenticated one or more persons associated with the LEA via the telecommunication network.

9. The non-transitory computer-readable storage medium of claim 8, wherein sending the biometric information associated with the registered telecommunication network user to the authenticated one or more persons associated with the LEA comprises sending location of the biometric information via a handover interface to the authenticated one or more persons associated with the LEA in the telecommunication network.

10. The non-transitory computer-readable storage medium of claim 9, wherein the biometric information of the one or more persons associated with the LEA and the biometric information of the registered telecommunication network user are stored in a lawful interception user authentication database associated with the telecommunication network.

11. The non-transitory computer-readable storage medium of claim 10, further comprising:
confirming identity of the registered telecommunication network user by the LEA based on the sent biometric information of the registered telecommunication network user by the telecommunication network to authenticate the intercepted data is associated with the registered telecommunication network user.

12. The non-transitory computer-readable storage medium of claim 11, further comprising:
obtaining the biometric information associated with the registered telecommunication network user using a device configured to receive the biometric information during an initial registration of the telecommunication network user with the telecommunication network; and
storing the obtained biometric information associated with the registered telecommunication network user in the lawful interception user authentication database.

13. The non-transitory computer-readable storage medium of claim 12, further comprising:
providing biometric information by the registered telecommunication network user to gain access to the telecommunication network to make a call;
obtaining the biometric information associated with the registered telecommunication network user by the telecommunication network upon a request of the registered telecommunication network user to gain access to the telecommunication network to make the call;
associating the obtained biometric information from the registered telecommunication network user with the biometric information stored in the lawful interception user authentication database in the telecommunication network; and
providing access to the registered telecommunication network user to make the call using the telecommunication network upon a successful association.

14. A system for securely authenticating and lawfully intercepting data using biometrics, comprising:
a telecommunication network;
an LEA network communicatively coupled to the telecommunication network; and
a lawful interception user authentication database coupled to the telecommunication network and the LEA network, wherein the telecommunication network authenticates one or more persons associated with the LEA network using biometric information upon receiving a request for lawful interception of data from the one or more persons associated with the LEA network, wherein the telecommunication network activates the lawful interception request associated with a registered telecommunication network user to obtain the data upon a successful authentication of one or more persons associated with the LEA network, wherein the telecommunication network intercepts the data associated with the registered telecommunication network user upon a successful match with a requested registered telecommunication network user by the LEA network, and wherein the telecommunication network sends the intercepted data along with the biometric information associated with the registered telecommunication network user to the authenticated one or more persons associated with the LEA network.

15. The system of claim 14, wherein a handover interface in the telecommunication network sends location of the biometric information associated with the registered telecommunication network user to the authenticated one or more persons associated with the LEA.

16. The system of claim 15, wherein the lawful interception user authentication database includes the biometric information of the one or more persons associated with the LEA and the biometric information of the registered telecommunication network user.

17. The system of claim 16, wherein the LEA network confirms identity of the registered telecommunication network user based on the sent biometric information of the registered telecommunication network user by the telecommunication network to authenticate the intercepted data is associated with the registered telecommunication network user.

18. The system of claim 17, wherein the telecommunication network obtains the biometric information associated with the registered telecommunication network user using a device configured to receive the biometric information during an initial registration of the telecommunication network user, and stores the obtained biometric information associated with the registered telecommunication network user in the lawful interception user authentication database.

* * * * *